Oct. 5, 1965  W. HOLZER  3,210,486
PRESSURE OPERATED SWITCH WITH BEARING MEMBER PLATE
Filed Nov. 7, 1961  3 Sheets-Sheet 1
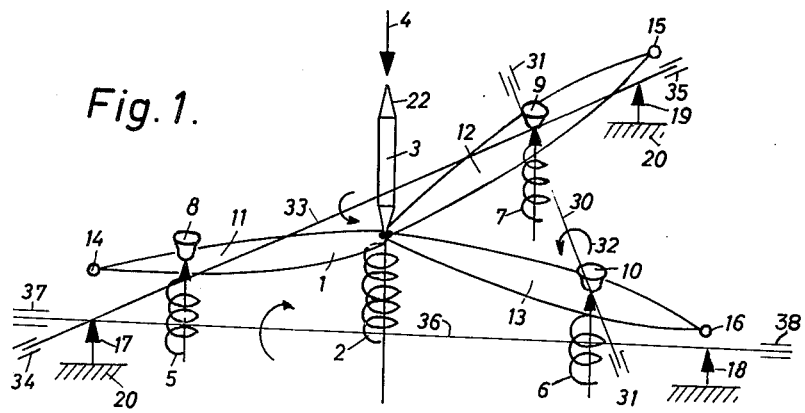
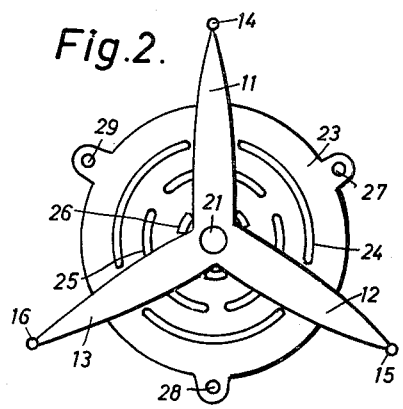
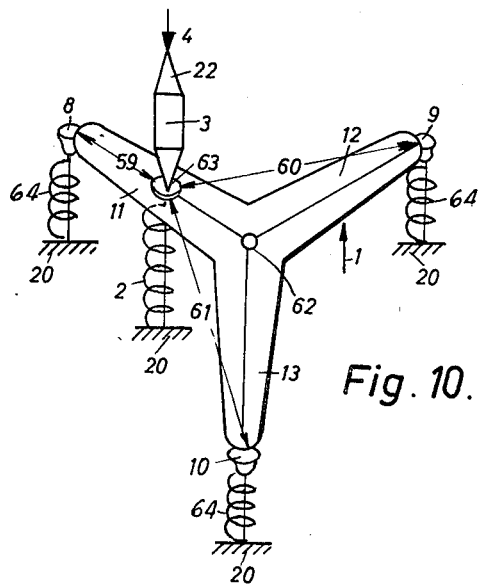
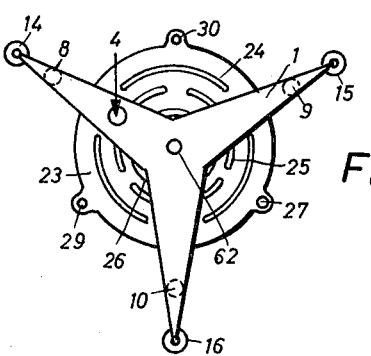
INVENTOR:
WALTER HOLZER
By Toulmin & Toulmin
Attorneys

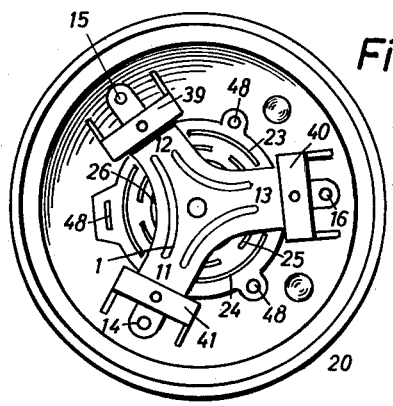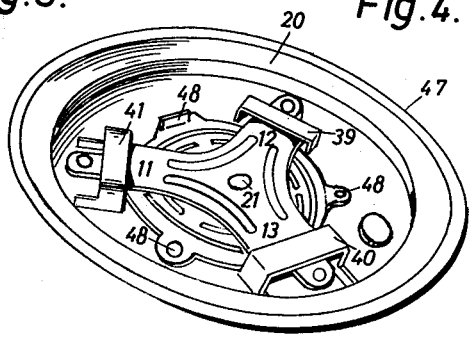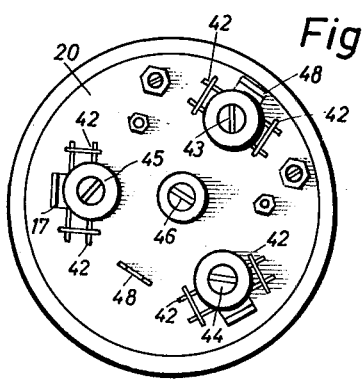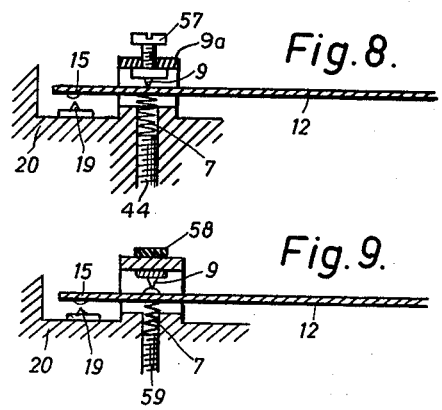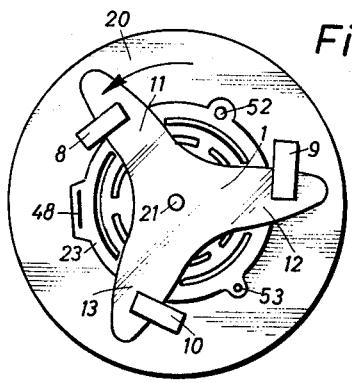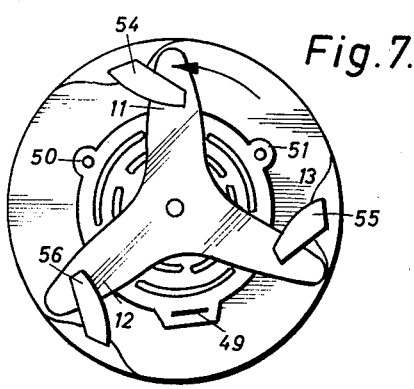
INVENTOR:
WALTER HOLZER

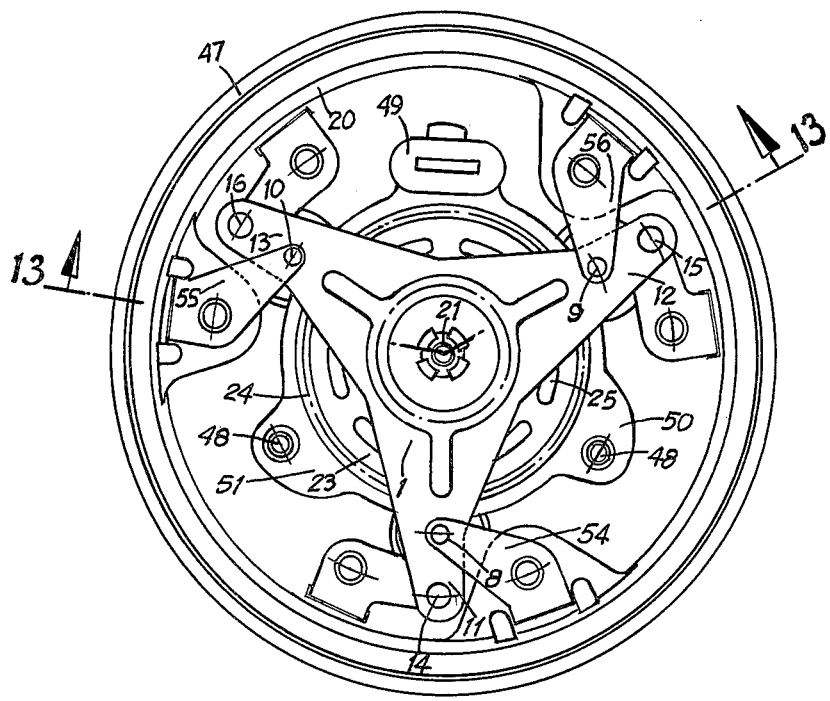

United States Patent Office 3,210,486
Patented Oct. 5, 1965

3,210,486
PRESSURE OPERATED SWITCH WITH BEARING
MEMBER PLATE
Walter Holzer, Schutzenrain, Meersburg (Bodensee),
Baden, Germany
Filed Nov. 7, 1961, Ser. No. 150,718
Claims priority, application Germany, Nov. 8, 1960,
H 40,880; Aug. 2, 1961, H 43,308
11 Claims. (Cl. 200—18)

The present invention relates to a pressure-operated multiple contact switch.

It is an object of the invention to provide a pressure-operated switch which operates with substantially no friction to close three contacts seriatim as the switch-operating pressure increases and to open such contacts as such pressure decreases.

A switch of this kind is required, for instance, in washing machines as a diaphragm switch for adjusting different water levels.

Diaphragm switches are known but can control only one water (or other liquid) level and they do not operate without friction, i.e. the operation of such switches as the pressure increases differs from the operation which they provide as the pressure decreases, with the result that as the switch moves backwards and forwards during switching, operation varies which, in turn, effects the water levels. For example, while the inlet and outlet valves are operated at one water level in the case of a rising water level, they will be operated at a different water level in the case of a falling water level.

It is an object of the invention to obviate these disadvantages and to provide a switch which operates substantially with no friction to close three contacts seriatim as the switch-operating pressure increases and to open such contacts as such pressure decreases.

According to one aspect of the present invention in a preferred embodiment thereof, it is suggested to provide the following arrangement:

There is first provided a switching plate carrying three contacts cooperating with but normally disengaged from three counter contacts. There are next provided at one side of the plate three stationary bearing members and three springs urge the plate from its other side and at three different locations against said three bearing members, respectively. A pin is provided applying a pressure force to a spot on said plate and opposing the spring force so that the plate disengages from the bearing members in predetermined succession thereby performing a tumbling motion. If the three springs are of different strength, the pin will bear against the switch plate at the center thereof and at similar distance from the spots of bearing members-plate engagement. If the three springs are of equal strength, the pin will bear against the plate at a spot having three respectively differing distances from the three spots of bearing members-plate engagement.

To ensure that the switch plate operates without friction as it moves, the switch plate is being guided in its tumbling vertical reciprocating motion by a resilient guide member such as a plate type spring which is known per se, for example, for moving coils in loudspeakers. Such guide member is formed with arcuate slots and which is known as a spider. The spider guides the switch plate as it moves up and down and also allows the switch plate to pivot around appropriately set-up pivot axes, so that the tumbling motion is a combined pivoting about several axes. The pivot axes will be described below with reference to the drawings. For the sake of simple construction, the guide member i.e. the spider, can be conductively connected to the switch plate. The spider may be secured to the casing at places in between neighboring switch plate contacts. To provide snap operation of the contacts, the bearing members can be formed as magnets to which the switch plate sticks.

The switch plate preferably is formed by three arms of similar length extending from a common center while being offset from one another by 120°. A bearing is provided at this common center to cooperate with a thrust pin. This construction is very useful where the switch is used in a round diaphragm switch such as is used to transmit the pressure of the water column.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

FIGURE 1 illustrates schematically the cooperation between a switch plate, bearing members and contacts according to a first embodiment of the invention;

FIGURE 2 illustrates a top view of the switch plate guided by a spider;

FIGURE 3 is a plan view of the pressure-operated switch with the diaphragm removed;

FIGURE 4 is a side perspective view corresponding to FIG. 3;

FIGURE 5 is an inverted plan view corresponding to FIG. 3;

FIGURE 6 is a plan view of a switch plate with the arms showing how the same are secured below the hooked bearing members;

FIGURE 7 illustrates another construction of the bearing members;

FIGURE 8 shows provision for adjustment of the bearing members;

FIGURE 9 illustrates the use of a permanent magnet;

FIGURE 10 diagrammatically illustrates a switch plate without contacts and with bearing members having an eccentric place of support;

FIGURE 11 illustrates a top view of the switch plate of FIG. 10 together with contacts and spider guide member and with schematically indicated bearing members;

FIGURE 12 is an enlarged plan view of the device shown in FIGURE 7; and

FIGURE 13 is a cross-sectional view taken on the lines 13—13 of FIGURE 12.

Referring to FIGS. 1 and 2 a switch plate 1 is resiliently supported by a spring 2, for example, a coil spring which is being increasingly loaded as a thrust pin 3 is being urged in the direction indicated by an arrow 4. In the construction shown in FIG. 1, compression springs 5, 6, 7 such as coil springs having differing strengths urge plate 1 upwardly against bearing members 8, 9, 10 disposed above the said compression springs. Contacts 14, 15, 16 are disposed on the ends of the switch plate 1 which, in the embodiment under consideration, is comprised of arms 11, 12, 13 disposed at 120° to one another. In this embodiment the contacts 14–16 are electrically interconnected since the switch plate is conductive and thus they form a central contact. Stationary contacts 17, 18, 19 are provided as fixed abutments and they make contact respectively with contacts 14, 16 and 15. The contacts 17, 18 and 19 are non-resiliently disposed on a base of a casing 20 which is diagrammatically illustrated in FIG. 1. The arms 11–13 which form the switch plate 1 are mechanically interconnected at the center thereof. A bearing 21 is provided at the center of plate 1 engaged by one apex of the pin 3.

The other apex 22 of pin 3 thereof engages in an appropriate bearing disposed in a diaphragm which is not shown and which is known per se.

Referring further to FIG. 2, there can be seen a metallic guiding element 23 known as a spider which is formed with offset arcuate slots 24–26 to provide resilient guiding of the spring 2 shown in FIG. 1. The spider 23 enables switch plate 1 to perform a tumbling i.e. pivoting substantially friction-free motion while permitting simultaneous vertical reciprocation. The spider 23 is secured to the casing by means of lugs 27, 28 and 29 which are disposed symmetrically to the contacts 14–16 of the arms 11–13.

Operation is as follows:

It will be assumed that the compression spring 5 is the weakest spring, that spring 6 is of intermediate strength and that spring 7 is the strongest spring. When a downwardly (arrow 4) directed pressure is exerted upon pin 3, spring 5 is being compressed so that arm 11 dips down and it appears that the entire plate 1 pivots about an axis 30 running through the points where bearing members 9 and 10 engage arms 12 and 13, respectively. The bearing members can, for example, be found as knife edges (see, for example, FIG. 8 or 9). The position of the pivot axis 30 is illustrated by way of phantom bearings 31, which, of course, do not exist, since members 9 and 10 constitute the actual bearings.

The pivot motion is carried out in a direction indicated by an arrow 32, whereby arm 11 disengages from its bearing member 8 until the contact 14 engages firmly with its stationary counter contact 17 which is connected to the base 20.

As the pressure operative in the direction indicated by the arrow 4 increases further, arm 13 dips and a second rotational axis 33 is being defined running through the point of engagement of contacts 14 and 17, both of which can be of corresponding design and through the engagement of bearing member 9 which bears against the arm 12. This pivot motion about axis 33, of course, results from the fact that spring 6 is weaker than spring 7 as afore defined. This axis 33 is illustrated again by direction-defining phantom bearings 34 and 35. As pressure still increases, the contact 16 engages the matching contact 18 so that this second contact is now closed subsequent to but independently of the closing of the first pair of contacts 14, 17.

As the pressure operative in the direction of the arrow 4 further increases, a third rotational axis 36 is formed as represented by phantom bearings 37, 38. The axis 36 runs through the point where contact 14 engages contact 17 and the point where contact 16 engages contact 18. If the pressure increases any further, contact 15 finally engages with its stationary counter contact 19.

The events just described occur in the reverse order as the pressure decreases, i.e. the contacts above the strongest compression spring open first. The contact 15 and counter contact 19 will open first, whereafter contacts 16, 18 will open, and finally, contacts 14 and 17 will open.

The entire arrangement operates substantially without friction and without hysteresis. The switching device is of very light construction and is unaffected by vibration. If the bearing members 8–10 are formed as magnets, the contacts will operate by snap action. Pressure can be transmitted to the pin 3 in any suitable manner as desired, for example, water i.e. hydraulic pressure may urge against a diaphragm which, in turn, bears against pin 3 or pressure may be transmitted upon pin 3 by electromagnetic means. A wide variety of relationships between contact movement and pressure can be provided. For instance, the magnets associated with the bearing members 8–10 can be electromagnets and can be controlled in dependence upon the load pressure.

FIGS. 8 and 9 illustrate in cross-sectional view the relative position of a switch arm such as 12 into a space defined by a bearing supporting member 9a supporting the bearing proper 9. A compression spring such as 7 the bearing member proper 9. A compression spring such as 7 engages arm 12 from below and urges the arm against bearing member 7. By means of, for example, an adjustable screw 44 in FIG. 8, the spring pressure is made adjustable, a screw 57 serves to adjust the distance between contacts 15 and 19 when in open position.

The bearing supporting member 9a can have several different shapes as will be explained with reference to FIGS. 3 to 7.

In FIG. 9 there is further shown an additional feature. There is provided a permanent magnet 58 which is secured to the casing. An adjusting screw 59 serves to adjust the pressure of spring 7. One can readily see that bearing 9 is shaped like a knife edge.

In FIGS. 3 to 5 like references denote corresponding elements. There are provided yokes 39, 40, and 41 serving as bearing supporting members, and they are connected to the casing 20 by means of pins 42 or by lapping. The compression springs are hidden under the yokes and arms (see FIGS. 8 and 9) and cannot be seen in FIGS. 3–5. The springs 5, 6 and 7 are respectively adjusted by screws 43, 44, and 45. The yokes 39, 40 and 41 serve as support for the bearing members engaging the arms 11, 12, 13 respectively, of switch plate 1. As one can see from the drawing, these switch plate arms respectively project into space defined by each of these yokes as specifically shown in FIG. 8 or 9. The connections to the stationary contacts 17, 18 and 19 which are formed as abutments, are freely accessible, and the central contact 46 has a conductive continuous connection to the switch plate 1. The diaphragm (not shown) operating the pin such as 3 in FIG. 1 would engage the flange 47 of molded housing 20. The spider 23 still serving as switch plate guiding spring 2 is secured to the casing by lapping 48 to ensure proper grounding.

Referring to FIG. 6, there is shown an embodiment resembling the ones as described in the foregoing, but having a different type of bearing support. Hook-shaped bearing supporting members 8, 9 and 10 are secured to the base of casing 20 and the bearing members proper are connected to each such bearing supporting member as shown in FIG. 8 or 9. By means of the central bearing plate 21, the arms 11–13 of the switch plate 1 can be urged towards the base of casing 20 via a thrust pin 3 which is not visible in FIG. 6 but is similar to that of FIG. 1. This movement is opposed by the compression springs which are disposed below the arms 11–13 as afore described. The metallic spider 23 aids to resiliently guide the switch plate 1.

The spider 23 is connected to the base of casing 20, for instance, by riveting 49 (FIG. 7) and is secured to the base of casing 20 by means of securing projections or lugs 50, 51 which engage in matching recesses. The spider 23 is being prestressed so that it bulges upwardly i.e. towards the switch plate 1 thus providing for a straight or parallel guiding direction when the switch plate 1 is urged towards the base of casing 20 as aforedescribed. The spider 23 is being fastened to the base of casing 20 at locations between the arms 11, 12, 13 of switch plate 1. As shown in FIG. 6, pins 52, 53 connect spider 23 to casing 20 in a manner similar to the projectings 50, 51 of FIG. 7.

The bearing supporting members in FIG. 7 take the form of parts 54–56 which are bent out of the base of the casing 20. The bearing supporting members can be provided with adjusting screws 57 (see FIG. 8), the ends of which are so devised that the bearing member is of use more particularly as a bearing in the tumbling motion of the switch plate 1.

In the constructions illustrated in FIGS. 6–7, the switch plate 1 is secured in bayonet-fashion and thus can readily be removed and fitted for assembly. Also, springs can be replaced, while the distance between the arms and the securing plane can be adjusted by the hooked bearing members being bent correspondingly.

In FIGS. 10 and 11 like references denote corresponding elements. FIG. 10 illustrates a switch plate 1 having an eccentric support disc 63 engaging a thrust pin 3 urged in the direction indicated by an arrow 4, the pin 3 acting, for instance, by means of a needle bearing. Thrust pin 3 is the distance dependent central element and comprises, for instance, a bimetallic strip. Disposed below the arms 11–13 of switch plate 1 are bearing members 8–10 which enter into bearing engagement with compression springs 64 of similar strength whenever a spring 2 associated with eccentric bearing disc 63 is appropriately compressed by the pin 3. Spring 2 is weaker than springs 64. Bearing members 8, 9, 10 are located at different distances 59, 60, 61 respectively from the spot at disc 63 subjected to the switch actuating pressure force. The switch plate 1 is connected at its physical center 62 to the metal guide member or to the spider 23.

When the pin 3 is urged downward and in the direction indicated by the arrow 4, the contact 14 first engages with its counter contact 17, the contact 15 subsequently engages with its counter contact 19, and thereafter the contact 16 engages with its counter contact 18 in a manner as aforedescribed. The stationary counter contacts 17–19, the compression springs 58 of similar strength and spring 2 are all secured to the base of casing 20. Otherwise, operation is as described with reference to FIGS. 1 and 2. The bearing members, the mounting of the switch plate 1 and the connection thereof to the base of a casing 20 and the guide members 23 can be exactly as described with reference to FIGS. 3–7, and adjustment can be effected as shown in FIGS. 8 and 9.

The invention is not limited to the embodiments described above but all changes and modifications thereof not constituting departures from the spirit and scope of the invention are intended to be covered by the following claims:

I claim:

1. Pressure actuated multiple contact switch comprising: a housing; a switch plate positioned in said housing; three distinct contact members on one side of said plate; three stationary contacts respectively positioned adjacent said switch plate contact members; three stationary bearing members disposed on the other side of said switch plate and around a common center; spring means of different strength, each positioned on said one side of said plate opposite a stationary bearing for urging said switch plate from the other side thereof against said bearing members and into engagement therewith; a pin for applying a pressure force to a spot on said other side of said switch plate and in a direction opposing the force of said spring means, said spot being located on said switch plate so that said switch plate disengages from said bearing members in predetermined succession; and a guiding spring engaging said plate from said other side adjacent said spot.

2. Pressure actuated switch as set forth in claim 1, each bearing member being mounted on a stationary supporting member, with each said supporting member being fastened to said housing, there being a screw for each bearing member for adjusting the normal distance between a switch plate contact and a stationary contact.

3. A pressure actuated multiple contact switch comprising: supporting means; a switch plate having three contact arms extending from a common center at 120° mutual displacement; three stationary bearing members on said supporting means disposed on one side of said plate around said center thereof and at 120° mutual displacement; spring means each of different strength resiliently urging each arm from the other side of said plate against one bearing member; a contact on the other side of each arm; a stationary contact for each said contact arm contacts and being normally disengaged therefrom; a pin applying a pressure force to one spot of said switch plate and on said one side thereof in a direction opposing the force with which said arms are being urged against said bearing member by said spring means; said spot having such a location at said switch plate so that upon application of said pressure said arms disengage from their respective bearing members in predetermined succession with the contact arm contacts engaging the respective stationary contact in corresponding succession; and a flat prestressed resilient plate having arcuated slots resiliently engaging said switch plate on said other side adjacent said spot.

4. A pressure actuated switch as set forth in claim 3, there being magnets at said bearing members attracting said switch plate.

5. A pressure actuated switch as set forth in claim 3, said bearing members being mounted on yokes secured to said supporting means and respectively receiving said arms.

6. A pressure actuated switch as set forth in claim 3, said bearing members being mounted on brackets attached to said supporting means around said centers.

7. A pressure actuated switch as set forth in claim 3, and resilient plate being electrically conductively connected to said switch plate.

8. A pressure actuated switch as set forth in claim 7, said resilient plate being fastened to the supporting means at locations in between said arms.

9. A pressure actuated multiple contact switch comprising: supporting means; a switch plate having three contact arms extending from a common center at 120° mutual displacement; three stationary bearing members mounted on said supporting means disposed on one side of said plate around said center thereof and at 120° mutual displacement; each arm having a spring bearing thereagainst on the other side thereof opposite said bearing member, there being three springs of differing strength, each spring urging its associated arm from the other side of said plate against one bearing member; a contact on one side of each arm; a stationary contact for each said contact arm contacts and being normally disengaged therefrom; a pin applying a pressure force at said center of said plate and on said one side thereof opposing said springs; and a flat resilient plate having arcuated slots for resiliently engaging said switch plate on said other side adjacent said spot.

10. A pressure actuated switch as set forth in claim 9, said springs being spiral springs.

11. A pressure actuated multiple contact switch comprising: supporting means; a switch plate having three contact arms extending from a common center at 120° mutual displacement; three stationary bearing members mounted on said supporting means disposed on one side of said plate around said center thereof and at 120° mutual displacement; a spring for each arm on the other side of the plate; each spring being of similar strength and urging its associated arm from the other side of said plate against one bearing member; a contact on each arm; a stationary contact for each said contact arm contacts and being normally disengaged therefrom; a pin applying pressure to said plate at a point having different distances from all those points of arm-bearing member engagement; and a flat resilient plate having arcuated slots resiliently engaging said switch plate on said other side adjacent said spot.

References Cited by the Examiner

UNITED STATES PATENTS

| | | | |
|---|---|---|---|
| 2,446,923 | 8/48 | Hardy | 200—80 |
| 2,720,563 | 10/55 | Williams | 200—80 |
| 2,779,836 | 1/57 | Williams | 200—80 |
| 2,856,479 | 10/58 | Fletcher | 200—80 |
| 2,938,975 | 5/60 | Williams | 200—80 |
| 2,950,367 | 8/60 | McCathron | 200—80 |
| 3,056,001 | 9/62 | Fichter | 200—67 |

BERNARD A. GILHEANY, *Primary Examiner.*

ROBERT K. SCHAEFER, *Examiner.*